US010235942B2

(12) United States Patent
Choi

(10) Patent No.: US 10,235,942 B2
(45) Date of Patent: Mar. 19, 2019

(54) ORGANIC LIGHT EMITTING DISPLAY PANEL AND ORGANIC LIGHT EMITTING DISPLAY DEVICE INCLUDING THE SAME

(71) Applicant: LG Display Co., Ltd., Seoul (KR)

(72) Inventor: WooSeok Choi, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/855,077

(22) Filed: Dec. 27, 2017

(65) Prior Publication Data

US 2018/0190205 A1 Jul. 5, 2018

(30) Foreign Application Priority Data

Dec. 30, 2016 (KR) ........................ 10-2016-0184470

(51) Int. Cl.

| | |
|---|---|
| ***G09G 3/30*** | (2006.01) |
| ***G06F 3/038*** | (2013.01) |
| ***G09G 3/3266*** | (2016.01) |
| ***G09G 3/3225*** | (2016.01) |

(52) U.S. Cl.

CPC ......... *G09G 3/3266* (2013.01); *G09G 3/3225* (2013.01); *G09G 2300/0814* (2013.01); *G09G 2310/06* (2013.01); *G09G 2310/08* (2013.01)

(58) Field of Classification Search

CPC ............... G09G 3/3225; G09G 3/3266; G09G 2300/0814; G09G 2310/06; G09G 2310/08

See application file for complete search history.

(56) References Cited

U.S. PATENT DOCUMENTS

| | | | | |
|---|---|---|---|---|
| 2011/0199357 | A1 | 8/2011 | Chung et al. | |
| 2013/0321376 | A1 | 12/2013 | Kim et al. | |
| 2018/0197496 | A1* | 7/2018 | Gao ..................... | G09G 3/3677 |
| 2018/0204521 | A1* | 7/2018 | Gu ........................... | G09G 3/36 |

FOREIGN PATENT DOCUMENTS

| | | | |
|---|---|---|---|
| KR | 2017-0124119 | A | 11/2017 |
| WO | 2016/148759 | A1 | 9/2016 |

* cited by examiner

*Primary Examiner* — Nelson M Rosario
(74) *Attorney, Agent, or Firm* — Polsinelli PC

(57) ABSTRACT

Disclosed are an organic light emitting display panel and an organic light emitting display device including the same, in which a gate driver for generating all of a gate signal and an emission control signal is embedded.

20 Claims, 6 Drawing Sheets

ORGANIC LIGHT EMITTING DISPLAY PANEL AND ORGANIC LIGHT EMITTING DISPLAY DEVICE INCLUDING THE SAME

CROSS-REFERENCE TO RELATED APPLICATION

This application claims the benefit of the Korean Patent Application No. 10-2016-0184470 filed on Dec. 30, 2016.

BACKGROUND

Field of the Disclosure

The present disclosure relates to a display device, and more particularly, to an organic light emitting display panel and an organic light emitting display device including the same.

Discussion of the Related Art

Flat panel display (FPD) devices are applied to various kinds of electronic products such as portable phones, tablet personal computers (PCs), notebook PCs, etc. Examples of the FPD devices (hereinafter referred to as a display device) include liquid crystal display (LCD) devices, organic light emitting display devices, etc. Recently, electrophoretic display devices (EPDs) have been widely used as a type of FPD device.

As a type of FPD device (hereinafter referred to as a display device), organic light emitting display devices have a fast response time of 1 ms or less and low power consumption, and thus, are attracting much attention as next generation display devices.

FIG. 1 is an exemplary diagram illustrating a gate driver and an emission driver applied to the related art organic light emitting display panel.

A gate driver 10 for generating gate signals VG1 to VGg supplied through gate lines and an emission driver 20 for generating emission control signals EM1 to EMg should be provided for performing internal compensation on an organic light emitting display device.

The gate driver 10 includes a plurality of stages Stage 1 to Stage g, and in order to generate the gate signals VG1 to VGg, two or more gate clocks GCLK are needed.

The emission driver 20 includes a plurality of stages Stage 1 to Stage g, and in order to generate the emission control signals EM1 to EMg, two or more emission clocks EMCLK are needed.

That is, in the related art organic light emitting display device, the gate driver 10 and the emission driver 20 are individually provided, and the gate clocks GCLK necessary for driving the gate driver 10 and the emission clocks EMCLK necessary for driving the emission driver 20 are needed.

In this case, since the gate driver 10 and the emission driver 20 should be individually provided in a non-display area of the organic light emitting display panel, a size of the non-display area of the related art organic light emitting display panel inevitably increases, and there is a limitation in decreasing the size of the non-display area of the related art organic light emitting display panel.

Moreover, since the gate clocks GCLK for the gate driver 10 and the emission clocks EMCLK for the emission driver 20 should be transmitted to the organic light emitting display panel, a circuit becomes complicated, and thus, a failure rate of the organic light emitting display panel increases.

SUMMARY

Accordingly, the present disclosure is directed to provide an organic light emitting display panel and an organic light emitting display device including the same that substantially obviate one or more problems due to limitations and disadvantages of the related art.

An aspect of the present disclosure is directed to provide an organic light emitting display panel and an organic light emitting display device including the same, in which a gate driver for generating all of a gate signal and an emission control signal is embedded.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided an organic light emitting display panel including a display area including a plurality of pixels displaying an image and a non-display area surrounding an outer side of the display area. Each of the plurality of pixels includes a switching transistor connected to a gate line and a data line connected thereto, a driving transistor connected to the switching transistor and an organic light emitting diode, and an emission transistor connected to the driving transistor. The gate driver is embedded in the non-display area to supply a gate signal to the plurality of gate lines provided in the display area. The gate driver includes a plurality of stages respectively connected to the plurality of gate lines. An nth stage of the plurality of stages includes a pull-up transistor outputting a gate pulse to an nth gate line, a pull-down transistor outputting a gate low signal to the nth gate line, a selection signal generator connected to a gate of the pull-up transistor and a gate of the pull-down transistor, and a writing control transistor provided between the pull-down transistor and the selection signal generator, connected between a QB node supplied with a QB node signal and a low voltage node supplied with a low level voltage, and turned on or off by a writing control signal. The QB node is connected to an emission transistor included in each of pixels connected to an n+ath gate line, wherein "n" is a nature number, and "a" is an integer.

In another aspect of the present disclosure, there is provided an organic light emitting display device including an organic light emitting display panel including a plurality of gate lines, a plurality of data lines, a plurality of pixels, and a gate driver supplying gate signals to a plurality of switching transistors respectively included in the plurality of pixels, a data driver supplying data voltages to the plurality of data lines, and a controller controlling the gate driver and the data driver. The organic light emitting display panel includes a display area, including a plurality of pixels displaying an image, and a non-display area surrounding an outer side of the display area. Each of the plurality of pixels includes a switching transistor connected to a gate line and a data line connected thereto, a driving transistor connected to the switching transistor and an organic light emitting diode, and an emission transistor controlling an emission timing of the organic light emitting diode. The gate driver is embedded in the non-display area. The gate signal includes a gate pulse for turning on the switching transistor and a gate low signal for turning off the switching transistor. The gate driver generates an emission control signal which is to be supplied to an emission transistor included in each of pixels connected to an n+ath gate line, based on a QB node signal used to generate the gate low signal supplied through an nth gate line, wherein "n" is a nature number, and "a" is an integer.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
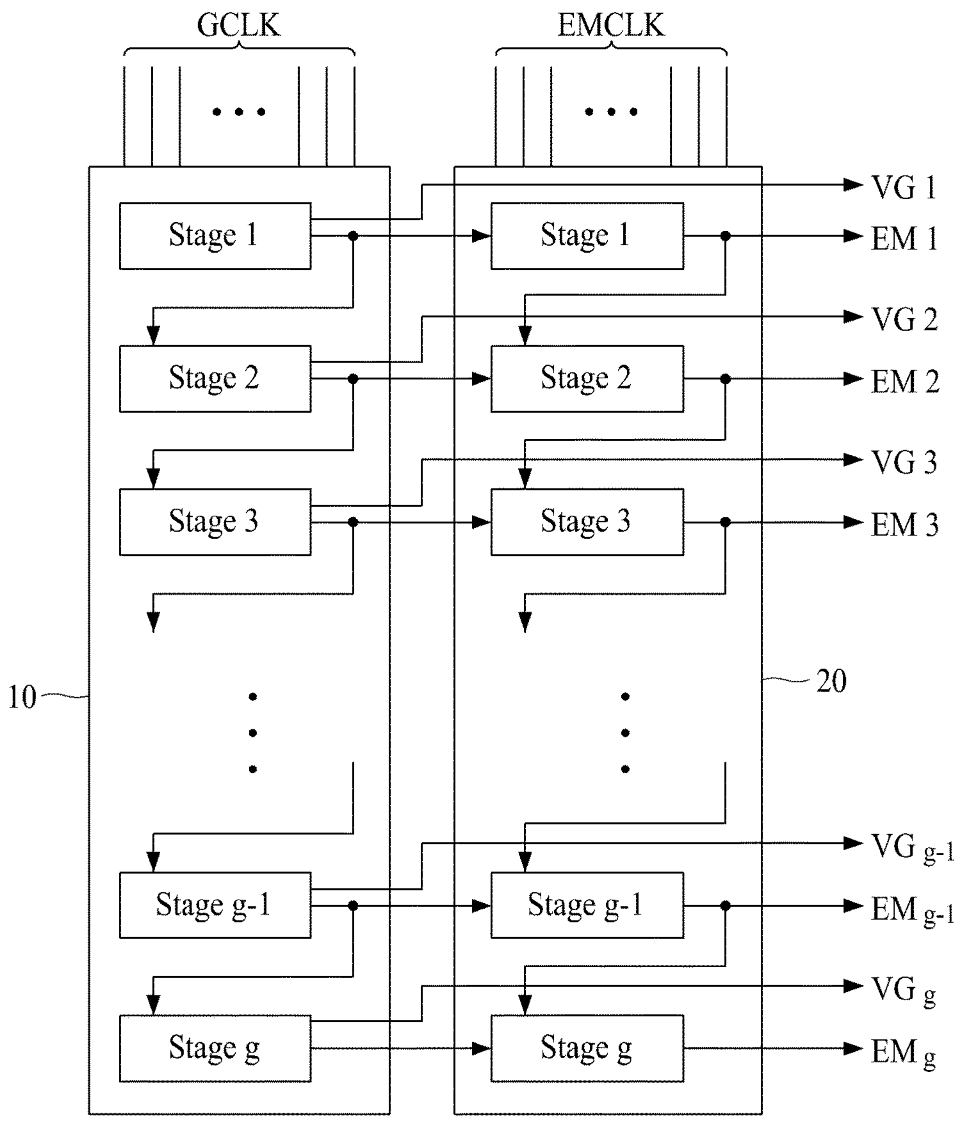
FIG. 1 RELATED ART
FIG. 1 is an exemplary diagram illustrating a gate driver and an emission driver applied to the related art organic light emitting display panel.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
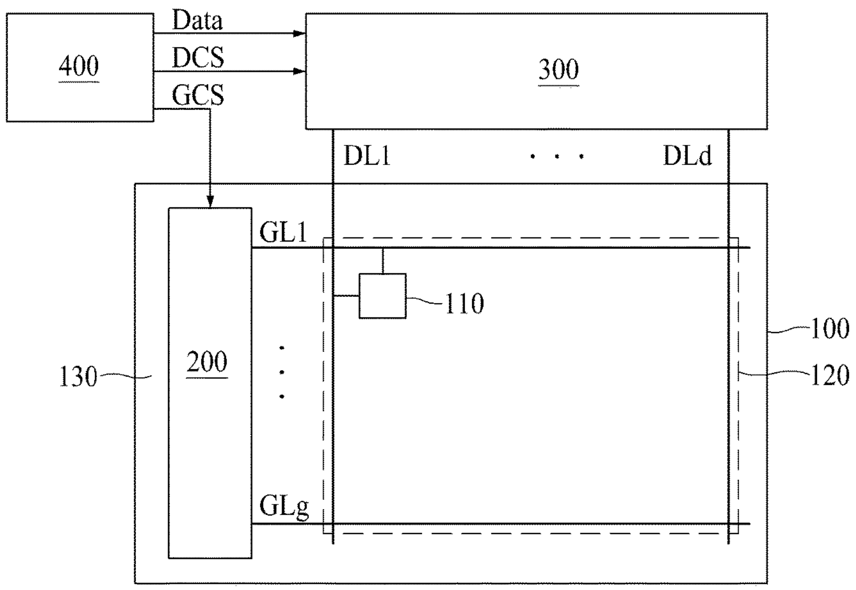
FIG. 2 is a block diagram illustrating a configuration of an organic light emitting display device according to an aspect of the present disclosure.
Figure 3:
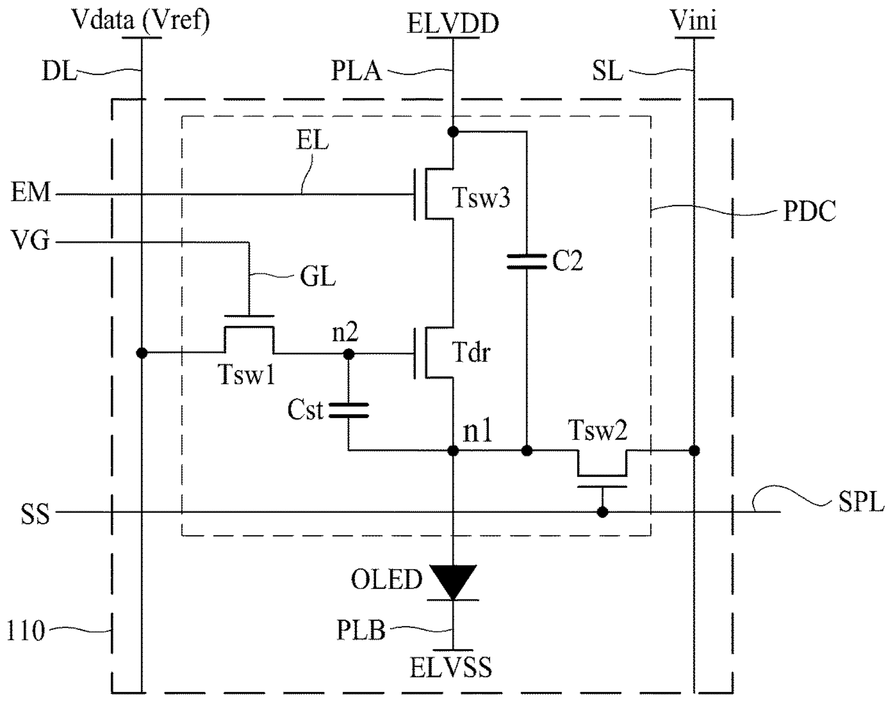
FIG. 3 is a circuit diagram illustrating a configuration of one pixel of an organic light emitting display panel according to an aspect of the present disclosure.

FIG. 2 is a block diagram illustrating a configuration of an organic light emitting display device according to an aspect of the present disclosure, and FIG. 3 is a circuit diagram illustrating a configuration of one pixel of an organic light emitting display panel according to an aspect of the present disclosure.

The organic light emitting display device according to an aspect of the present disclosure, as illustrated in FIGS. 2 and 3, may include an organic light emitting display panel 100, a data driver 300, and a controller 400.

First, the organic light emitting display panel 100 may include a plurality of gate lines GL1 to GLg, a plurality of data lines DL1 to DLd, a plurality of pixels 110, and a gate driver 200 for supplying gate signals VG to a plurality of switching transistors Tsw1 respectively included in the pixels 110.

The organic light emitting display panel 100 may include a display area 120, where the pixels 110 are provided to display an image, and a non-display area 130 disposed to surround an outer side of the display area 120.

Each of the pixels 110 may include a switching transistor Tsw1 connected to a gate line GL and a data line DL connected thereto, a driving transistor Tdr connected to the switching transistor Tsw1 and an organic light emitting diode OLED, and an emission transistor Tsw3 for controlling an emission timing of the organic light emitting diode OLED.

The gate driver 200 may be embedded in the non-display area 130. The gate driver 200 may be provided in the organic light emitting display panel 100 along with transistors through a process of forming the transistors included in the pixels 110. The gate driver 200 embedded in the organic light emitting display panel 100 may be referred to as a gate in panel (GIP) type gate driver 200.

The gate signal VG may include a gate pulse for turning on the switching transistor Tsw1 and a gate low signal for turning off the switching transistor Tsw1.

The gate driver 200 may generate an emission control signal EM which is to be supplied to the emission transistors Tsw3 respectively included in pixels connected to an $n+a^{th}$ gate line, based on a QB node signal used to generate the gate low signal supplied through an nth gate line, wherein "n" is a nature number, and "a" is an integer.

The pixels 110 may each include the organic light emitting diode OLED and a pixel driver PDC.

A plurality of signal lines DL, EL, GL, PLA, PLB, SL, and SPL for supplying a driving signal to the pixel driver PDC may be provided in each of the pixels 110.

A data voltage Vdata may be supplied through the data line DL, the gate pulse or the gate low signal may be supplied through the gate line GL, a first driving power ELVDD may be supplied through a power supply line PLA, a second driving power ELVSS may be supplied through a driving power line PLB, an initialization voltage Vini may be supplied through a sensing line SL, a sensing control signal SS for turning on a sensing transistor Tsw2 may be supplied through a sensing pulse line SPL, and the emission control signal EM for driving the emission transistor Tsw3 may be supplied through an emission line EL.

For example, as illustrated in FIG. 3, the pixel driver PDC may include the driving transistor Tdr including a source connected to the organic light emitting diode OLED, the emission transistor Tsw3 connected between the power supply line PLA and the driving transistor Tdr, the switching transistor Tsw1 connected between the data line DL and a gate of the driving transistor Tdr, and a storage capacitor Cst connected between a second node n2 connected to the gate of the driving transistor Tdr and a first node n1 connected to the source of the driving transistor Tdr to induce a storage capacitance. The pixel driver PDC may further include a capacitor C2 connected between the power supply line PLA and the first node n1.

The switching transistor Tsw1 may be turned on by the gate pulse supplied through the gate line GL and may transfer the data voltage Vdata, supplied through the data line DL, to the gate of the driving transistor Tdr. That is, the switching transistor Tsw1 may perform a function of addressing the data voltage Vdata according to the gate pulse.

The sensing transistor Tsw2 may be connected between the sensing line SL and the first node n1 between the driving transistor Tdr and the organic light emitting diode OLED and may be turned on by a sensing pulse included in the sensing control signal SS to sense a characteristic of the driving transistor Tdr. The sensing transistor Tsw2 may perform an initialization operation.

The emission transistor Tsw3 may be turned on or off by the emission control signal EM to transfer the first driving power ELVDD to the driving transistor Tdr or cut off the first driving power ELVDD. When the emission transistor Tsw3 is turned on, a current may be supplied to the driving transistor Tdr, and thus, the organic light emitting diode OLED may emit light. The emission transistor Tsw3 may perform a compensation and emission function.

The driving transistor Tdr may control the amount of current flowing to the organic light emitting diode OLED. The second node n2 connected to the gate of the driving transistor Tdr may be connected to the switching transistor Tsw1.

A structure of the pixel driver PDC may be implemented as various structures in addition to a structure illustrated in FIG. 3.

Hereinafter, a method of emitting light corresponding to the data voltage Vdata from the organic light emitting diode OLED by using the pixel driver PDC of FIG. 3 irrespective of a threshold voltage of the driving transistor Tdr will be briefly described. In this case, the gate signal VG, the emission control signal EM, and the sensing control signal SS may be supplied to the pixel driver PDC.

To provide an additional description, the organic light emitting display device according to an aspect of the present disclosure has a feature where the emission control signal EM is generated by the gate driver 200 along with the gate signal VG. In this case, a structure of the pixel driver PDC for performing the above-described function by using the gate signal VG and the emission control signal EM may be variously implemented in addition to the structure illustrated in FIG. 3, and a driving method of the pixel driver PDC may be variously implemented. Hereinafter, therefore, an example of the driving method of the pixel driver PDC will be briefly described with reference to FIG. 3.

First, in an initialization period, the emission transistor Tsw3 may be turned off, the switching transistor Tsw1 may be turned on, and the sensing transistor Tsw2 may be turned on. Therefore, the initialization voltage Vini may be supplied to the first node n1 through the sensing transistor Tsw2, and a reference voltage Vref may be supplied to the second node n2 through the data line DL. To this end, the emission control signal EM having a low value may be supplied to the emission transistor Tsw3.

Second, in a sampling period, the emission transistor Tsw3 may be turned on, and the sensing transistor Tsw2 may be turned off. To this end, the emission control signal EM having a high value may be supplied to the emission transistor Tsw3. In the sampling period, the sensing transistor Tsw2 may be turned off to allow the first node n1 to be floated, and a voltage of the first node n1 may increase with time. In this case, the voltage of the first node n1 may increase until a voltage difference between the second node n2 and the first node n1 reaches a threshold voltage Vth of the driving transistor Tdr. Therefore, at a last timing of the sampling period, a difference voltage "Vref−Vth" between the reference voltage Vref and the threshold voltage Vth of the driving transistor Tdr may be charged into the first node n1, and the reference voltage Vref may be charged into the second node n2. Therefore, at the last timing of the sampling period, a difference voltage "Vgs=Vref−(Vref−Vth)" between the gate and the source of the driving transistor Tdr may become the threshold voltage Vth of the driving transistor Tdr.

Third, in a data writing period, the emission transistor Tsw3 may be turned off, and the sensing transistor Tsw2 may be turned off. To this end, the emission control signal EM having a low value may be supplied to the emission transistor Tsw3. In this case, a voltage of the second node n2 may increase to the data voltage Vdata. Also, the voltage of the first node n1 may increase by a little more than the difference voltage "Vref−Vth" between the reference voltage Vref and the threshold voltage Vth. That is, the voltage of the first node n1 may increase to "Vref−Vth+α". Here, α may be a constant determined based on various capacitances. In this case, a difference voltage (i.e., the difference voltage Vgs between the gate and the source of the driving transistor Tdr) between the second node n2 and the first node n1 may become "Vdata−(Vref−Vth+α)=Vdata+Vth+K". Here, K may be "α-Vref", and thus, K may be a constant.

Fourth, in an emission period, the emission transistor Tsw3 may be turned on, and the sensing transistor Tsw2 may be turned off. To this end, the emission control signal EM having a high value may be supplied to the emission transistor Tsw3. In the emission period, the first node n1 and the second node n2 may be boosted by the first driving power ELVDD. However, the difference voltage (i.e., the difference voltage Vgs between the gate and the source of the driving transistor Tdr) between the second node n2 and the first node n1 may still be "Vdata−(Vref−Vth+α)=Vdata+Vth+K".

Brightness of the organic light emitting diode OLED may be proportional to a current Ioled flowing in the organic light emitting diode OLED as in the following Equation (1). The current Ioled flowing in the organic light emitting diode OLED may depend on the difference voltage Vgs between the gate and the source of the driving transistor Tdr and the threshold voltage Vtgh of the driving transistor Tdr. That is, the current Ioled flowing in the organic light emitting diode OLED may be proportional to $(Vgs-Vth)^2$:

$$I_{OLED} = \frac{1}{2} \times \mu \times \frac{W}{L} \times C_{GI} \times (V_{GS} - V_{TH})^2 \tag{1}$$

where μ denotes a mobility of the driving transistor Tdr, $C_{GI}$ denotes a parasitic capacitance of the driving transistor Tdr, W denotes a channel width of the driving transistor Tdr, L denotes a channel length of the driving transistor Tdr, $V_{GS}$ denotes a difference voltage between a gate voltage and a source voltage of the driving transistor Tdr, and $V_{TH}$ denotes the threshold voltage of the driving transistor Tdr.

In the emission period, as described above, the difference voltage Vgs between the gate voltage and the source voltage of the driving transistor Tdr may become "Vdata+Vth+K".

In this case, a difference value "Vgs−Vth" between the difference voltage Vgs between the gate voltage and the source voltage of the driving transistor Tdr and the threshold voltage Vth may become "(Vdata+Vth+K)−Vth=Vdata+K".

In Equation (1), $(Vgs-Vth)^2$ may become $(Vdata+K)^2$.

Therefore, in Equation (1), the current Ioled flowing in the organic light emitting diode OLED may be proportional to the square of "Vgs−Vth=(Vdata+Vth+K)−Vth=Vdata+K", and since K is a constant, the current Ioled may substantially be inversely proportional to the square of the data voltage. Therefore, the organic light emitting diode OLED may emit light corresponding to the data voltage Vdata irrespective of the shift of the threshold voltage Vth of the driving transistor Tdr.

As described above, the emission control signal EM having a low value may be supplied to the emission transistor Tsw3 in the initialization period, the emission control signal EM having a high value may be supplied to the emission transistor Tsw3 in the sampling period, the emission control signal EM having a low value may be supplied to the emission transistor Tsw3 in the data writing period, and the emission control signal EM having a high value may be supplied to the emission transistor Tsw3 in the emission period. In this case, the emission period may occupy most of one frame period. That is, the emission control signal EM may have a high value during a long period of the one frame period.

Therefore, in the organic light emitting display device according to an aspect of the present disclosure, the gate driver 200 may be configured to output the emission control signal EM which has a low value in the initialization period, has a high value in the sampling period, has a low value in the data writing period, and has a high value in the emission period.

A configuration and a function of the gate driver 200 for performing the above-described function will be described in detail with reference to FIGS. 4 to 8.

The controller 400 may output a gate control signal GCS for controlling the gate driver 200 and a data control signal DCS for controlling the data driver 300 by using a timing signal (for example, a vertical sync signal, a horizontal sync signal, and a clock) supplied from an external system. The controller 400 may sample input video data received from the external system, realign the input video data to generate digital image data Data, and supply the digital image data Data to the data driver 300.

The data driver 300 may convert the image data Data input from the controller 400 into data voltages Vdata and may transfer the data voltages Vdata for one horizontal line to the data lines DL1 to DLd at every one horizontal period in which the gate pulse is supplied to one gate line GL. The data driver 300 may transfer the initialization voltage Vini to the sensing transistor Tsw2 and may supply the reference voltage Vref to the data line DL.

Figure 4:
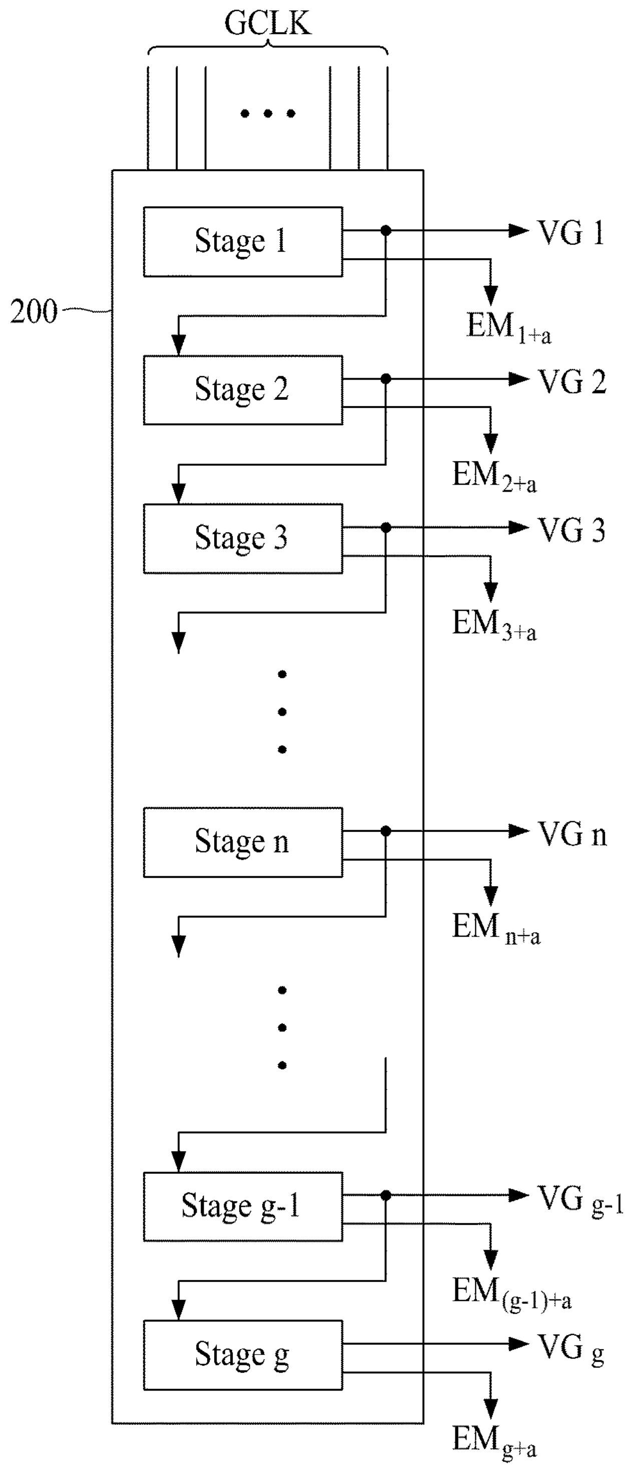
FIG. 4 is an exemplary diagram illustrating a configuration of a gate driver applied to an organic light emitting display device according to an aspect of the present disclosure.

FIG. 4 is an exemplary diagram illustrating a configuration of a gate driver applied to an organic light emitting display device according to an aspect of the present disclosure.

The gate driver 200, as illustrated in FIG. 4, may include a plurality of stages Stage 1 to Stage g connected to the gate lines GL1 to GLg. Two or more gate clocks GCLK may be supplied to the gate driver 200.

Each of the stages Stage 1 to Stage g may output the gate signal VG to a gate line GL connected thereto and may output the emission control signal EM to an emission line EL connected thereto.

To this end, for example, each of the gate line GL and the emission line EL may be provided as one in one horizontal line between vertically adjacent pixels. Here, for example, the horizontal line may denote a widthwise direction of the organic light emitting display panel 100 illustrated in FIG. 2, and pixels 110 may be provided under and on the horizontal line along the horizontal line.

In this case, the gate signal VG and the emission control signal EM output from one stage may be supplied to a gate line GL and an emission line EL which are provided in another horizontal line.

For example, as illustrated in FIG. 4, the gate signal VG output from a first stage Stage 1 may be output to a first gate line, and the emission control signal EM output from the first stage Stage 1 may be output to a 1+$a^{th}$ emission line. Therefore, in FIG. 4, the gate signal output from the first stage Stage 1 may be referred to as a first gate signal VG1, and the emission control signal output from the first stage Stage 1 may be referred to as a 1+$a^{th}$ emission control signal EM1+*a*.

Here, a may be changed based on the number of the gate clocks GCLK, the form of each of the gate clocks GCLK, and a structure of each of the stages.

To provide an additional description, in an aspect of the present disclosure, the emission control signal EM output from one stage may be supplied to pixels different from pixels to which the gate signal VG output from the one stage is supplied.

Signals necessary for driving of the first stage Stage 1 may be transferred from the outside of the gate driver 200, or may also be transferred from a dummy stage included in the gate driver 200.

Moreover, a g+$a^{th}$ emission control signal EMg+a output from a $g^{th}$ stage Stage g may be supplied to the dummy stage. Signals necessary for driving of the $g^{th}$ stage Stage g may be transferred from the outside of the gate driver 200, or may also be transferred from the previous stage included in the gate driver 200.

To this end, one or more dummy stages may be included in the gate driver 200.

Figure 5:
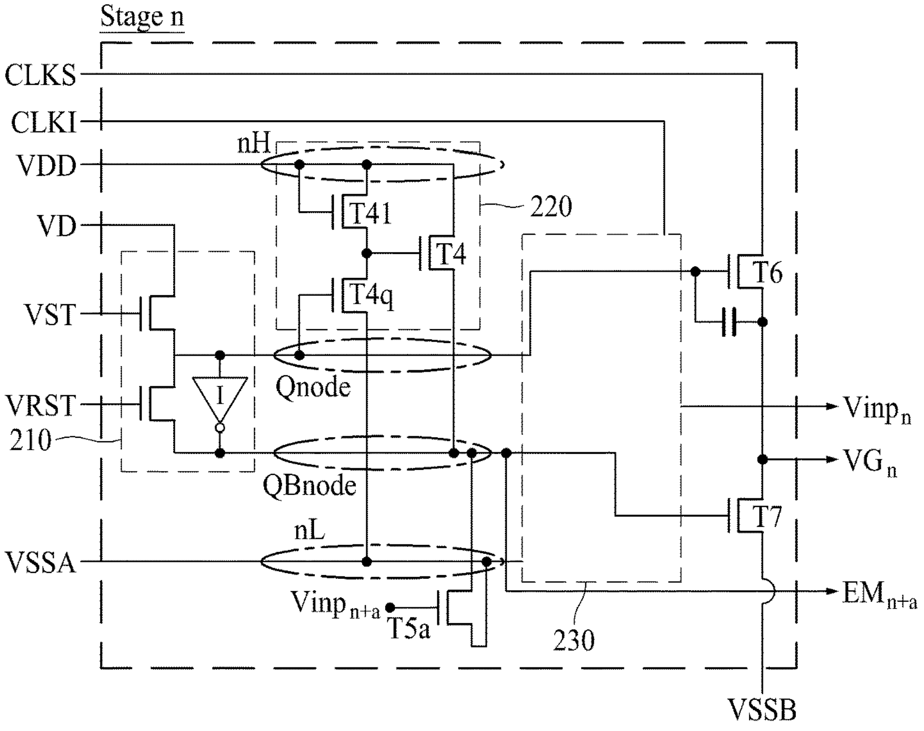
FIG. 5 is an exemplary diagram illustrating a configuration of an $n^{th}$ stage of a plurality of stages illustrated in FIG. 4.
Figure 6:
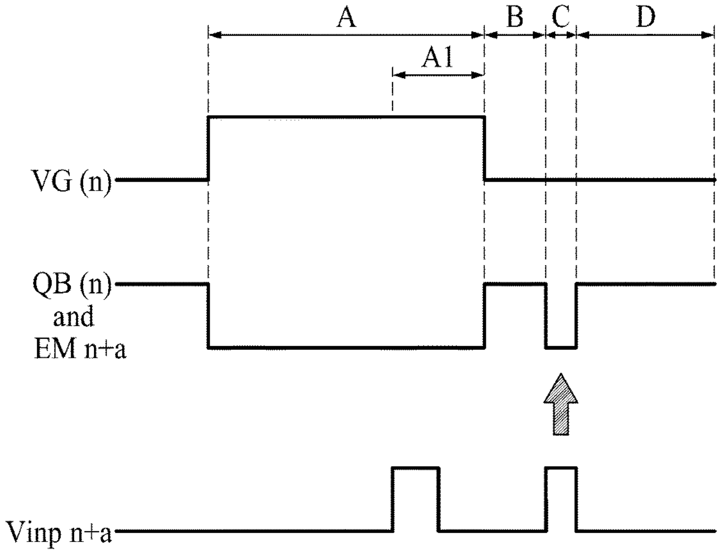
FIG. 6 is a waveform diagram for describing a driving method of the $n^{th}$ stage illustrated in FIG. 5.
Figure 7:
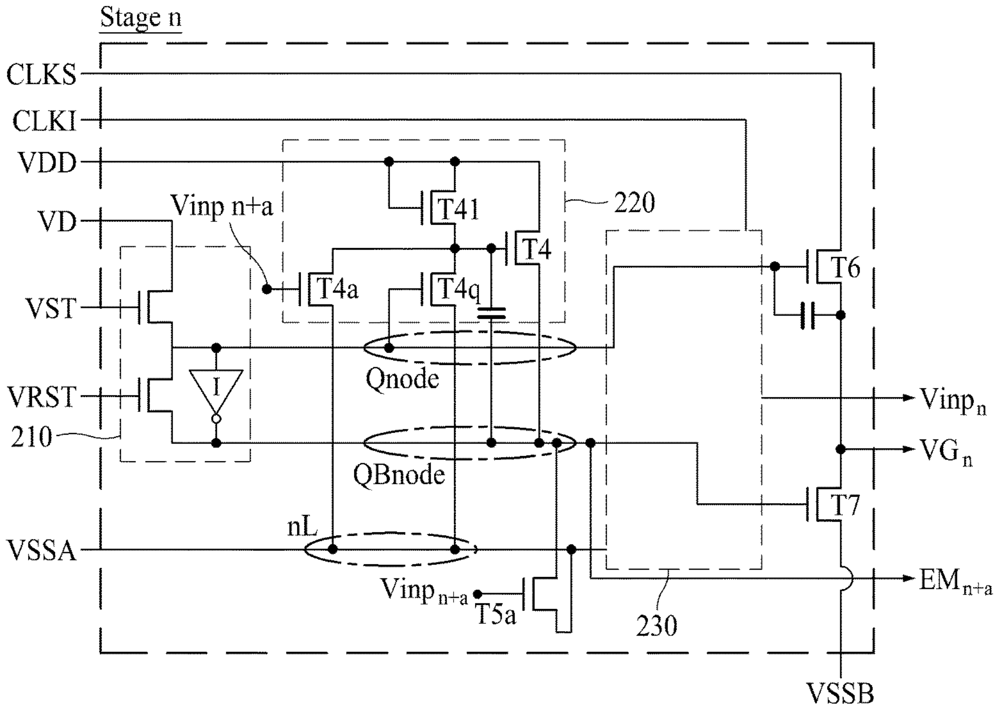
FIG. 7 is an exemplary diagram illustrating another configuration of the $n^{th}$ stage of the plurality of stages illustrated in FIG. 4.
Figure 8:
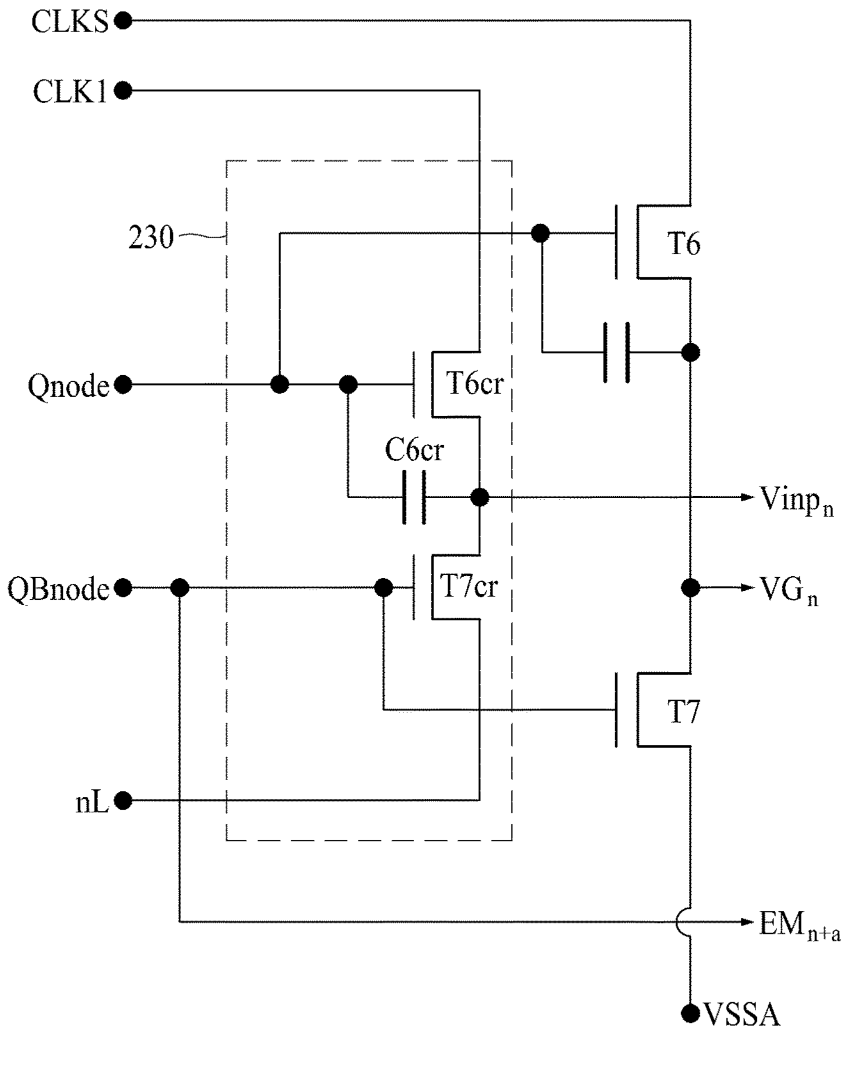
FIG. 8 is an exemplary diagram illustrating a structure of a carry generator illustrated in FIG. 5.

FIG. 5 is an exemplary diagram illustrating a configuration of an $n^{th}$ stage of a plurality of stages illustrated in FIG. 4. FIG. 6 is a waveform diagram for describing a driving method of the nth stage illustrated in FIG. 5. FIG. 7 is an exemplary diagram illustrating another configuration of the nth stage of the plurality of stages illustrated in FIG. 4. FIG. 8 is an exemplary diagram illustrating a structure of a carry generator illustrated in FIG. 5. In the following description, details which are the same as or similar to the details described above with reference to FIGS. 2 to 4 are omitted or will be briefly described.

As described above, the gate driver 200 may output the emission control signal EM, which has a low value in the initialization period A1, has a high value in the sampling period B, has a low value in the data writing period C, and has a high value in the emission period D, to the pixel driver PDC in order for the organic light emitting diode OLED to emit light corresponding to the data voltage Vdata irrespective of the shift of the threshold voltage Vth of the driving transistor Tdr.

To this end, as illustrated in FIG. 4, the gate driver 200 may include the stages Stage 1 to Stage g connected to the gate lines GL1 to GLg and the emission lines EL.

In this case, as described above, the emission control signal EM output from each of the stages may be supplied to pixels different from pixels to which the gate signal VG output from an arbitrary stage is supplied.

Hereinafter, an $n^{th}$ stage Stage n of the stages Stage 1 to Stage g will be described as an example of the present disclosure.

In this case, the nth stage Stage n may generate an emission control signal EMn+a which is to be supplied to emission transistors Tsw3 respectively included in pixels connected to an n+ath gate line, based on a QB node signal used to generate the gate low signal supplied to an nth gate line.

Particularly, as shown in FIG. 6, the $n^{th}$ stage Stage n may output the gate pulse to the nth gate line in an A period A in which the switching transistor Tsw1 connected to the nth gate line is turned on. The nth stage may supply a high signal to a QB node QBnode to output the gate low signal to the nth gate line in periods B to D other than the A period A in one frame period. In FIG. 6, a signal referred to by VG(n) denotes a gate signal supplied to the nth gate line. A signal referred to by QB(n) denotes the QB node signal supplied to the QB node QBnode. A signal referred to by EM(n+a) denotes an n+$a^{th}$ emission control signal supplied to an n+$1^{st}$ emission line. The QB node signal QB(n) and the n+$a^{th}$ emission control signal EM(n+a) are the same signal which is supplied to the QB node QBnode or is output from the QB node.

In this case, in a C period C, in which the emission transistor Tsw3 included in each of pixels connected to the n+$a^{th}$ gate line is turned off, of the periods B to D in which the gate low signal is output to the nth gate line, the nth stage Stage n may turn on a writing control transistor T5*a* to supply a low signal to the QB node QBnode.

Therefore, in the C period C, the n+$a^{th}$ emission control signal EM(n+a) may have a low value. Here, the C period D may be a data writing period in a pixel to which the n+$a^{th}$ emission control signal EM(n+a) is supplied. That is, in the periods B to D in which the gate low signal having a low value is output to the $n^{th}$ gate line, an operation corresponding to the data writing period may be executed in the pixel to which the n+$a^{th}$ emission control signal EM(n+a) is supplied.

In order to output the above-described signals, as illustrated in FIG. 5, the nth stage Stage n may include a pull-up transistor T6, a pull-down transistor T7, a selection signal generator 210, a writing control transistor T5*a*. Also, the $n^{th}$ stage Stage n may further include a switching unit 220 and a carry generator 230.

First, the pull-up transistor T6 may output an nth gate pulse to the nth gate line.

When a high signal is supplied from the selection signal generator 210 or the switching unit 220 to a Q node Qnode connected to a gate of the pull-up transistor T6, the pull-up transistor T6 may generate the nth gate pulse from a clock S(CLKS), and the nth gate pulse may be output to the nth gate line. Therefore, a switching transistor Tsw1 included in each of pixels connected to the nth gate line may be turned on, and thus, the organic light emitting diode OLED may emit light.

A period (i.e., an A1 period A1), which is adjacent to the B period B, of the A period A in which the nth gate pulse is output may be an initialization period of a pixel to which the n+$a^{th}$ emission control signal EM(n+a) is supplied.

Second, the pull-down transistor T7 may output an $n^{th}$ gate low signal to the nth gate line. A generic name for the nth gate pulse and the nth gate low signal output to the nth gate line may be an nth gate signal VGn.

When a high signal is supplied from the selection signal generator 210 or the switching unit 220 to the QB node QBnode connected to a gate of the pull-down transistor T7, the pull-down transistor T7 may generate the nth gate low signal from a low level voltage VSSB, and the nth gate low signal may be output to the nth gate line.

In this case, a switching transistor Tsw1 included in each of pixels connected to the $n^{th}$ gate line may be turned off.

The periods B to D in which the nth gate low signal is output may include a sampling period B, a data writing period C, and an emission period D of a pixel to which the n+$a^{th}$ emission control signal EM(n+a) is supplied.

Third, the selection signal generator 210 may be connected to a gate of the pull-up transistor T6 and a gate of the pull-down transistor T7.

The selection signal generator 210 may output a high signal to the Q node Qnode connected to the gate of the pull-up transistor T6 by using a driving voltage VD in the A period A in which the nth gate pulse is output. In this case, the selection signal generator 210 may output a low signal to the QB node QBnode connected to the gate of the pull-down transistor T7 by using an inverter I.

In the periods B to D in which the $n^{th}$ gate low signal is output, the selection signal generator 210 may output a low signal to the Q node Qnode and may output a high signal to the QB node QBnode.

To this end, the selection signal generator 210 may be connected to the driving voltage VD and a low level voltage VSSA or VSSB. That is, the selection signal generator 210 may be configured in various structures for performing the above-described function, in addition to a structure illustrated in FIG. 5.

Fourth, the writing control transistor T5*a* may be provided between the pull-down transistor T7 and the selection signal generator 210 and may be connected between the QB node QBnode, to which the QB node signal QB(n) is supplied, and a low voltage node nL to which the low level voltage VSSA is supplied. The QB node signal denotes a signal used to generate the gate low signal supplied to the nth gate line. The QB node signal may be supplied to the $n+a^{th}$ emission line through the QB node QBnode.

The writing control transistor T5*a* may be turned on or off by the writing control signal Vinp n+a. The writing control signal Vinp n+a may be supplied from the carry generator 230 included in an $n+a^{th}$ stage, or may be supplied from another stage. The writing control signal Vinp n+a may be one of the gate clocks GCLK. That is, in FIG. 5, the writing control signal supplied to the writing control transistor T5*a* is referred to by Vinp n+a, but as described above, the writing control signal may be supplied from the carry generator 230 of another stage instead of the $n+a^{th}$ stage. The writing control signal may be one of the gate clocks GCLK.

When the writing control signal is supplied as a high signal, the writing control transistor T5*a* may be turned on. In this case, the high signal supplied to the QB node QBnode may be discharged, through the writing control transistor T5*a,* to a terminal to which the low level voltage VSSA is supplied. Therefore, as shown in FIG. 6, the QB nod signal QB(n) may be a low signal.

As shown in FIG. 6, a period in which the writing control signal having a high value is supplied and thus the QB nod signal QB(n) having a low value is output may correspond to the C period C. The C period C, as described above, may be a data writing period of a pixel to which the $n+a^{th}$ emission control signal EM(n+a).

To provide an additional description, a low signal may be supplied to the QB node QBnode in the A period A, and after the A period A, a high signal may be supplied to the QB node QBnode. A period in which a high signal is supplied to the QB node QBnode may be the B period B, and the B period B may be a sampling period of a pixel to which the $n+a^{th}$ emission control signal EM(n+a) is supplied.

When the writing control signal having a high signal is supplied to the writing control transistor T5*a* at a time when a high signal is supplied to the QB node QBnode, as described above, the writing control transistor T5*a* may be turned on, and a high signal supplied to the QB node QBnode may be forcibly discharged through the writing control transistor T5*a*. Therefore, as shown in FIG. 6, the QB node signal QB(n) may be a low signal.

The QB node QBnode may be connected to an emission transistor included in each of pixels connected to the $n+a^{th}$ gate line. Therefore, the emission control signal output from the QB node QBnode may become the $n+a^{th}$ emission control signal EMn+a.

Fifth, the switching unit 220 may be connected between the Q node Qnode between the selection signal generator 210 and the pull-up transistor, the QB node QBnode, a high level node nH supplied with a high level voltage VDD higher than the low level voltage VSSA, and the low level node nL.

When a low signal is supplied to the Q node Qnode, the switching unit 220 may transfer a high signal to the QB node.

To provide an additional description, in a period (i.e., the B period, the C period, and the D period) after the A period, the switching unit 220 may supply a high voltage to the QB node QBnode by using the high level voltage VDD. Therefore, a high signal may be supplied to the QB node QBnode.

However, since the switching unit 220 is connected to the low level node nL, a high voltage transferred from the switching unit 220 may be discharged through the writing control transistor T5*a* in the C period C. In this case, since the QB node QBnode is also connected to the low level node nL through the writing control transistor T5*a,* a low signal may be supplied to the QB node QBnode.

To this end, as illustrated in FIG. 5, the switching unit 220 may be configured with three transistors T41, T4*q,* and T4.

In this case, in the A period A, the high level voltage VDD may be supplied to the low level node nL through a 41st transistor T41 and a 4qth transistor T4*q* which are turned on by a high signal supplied to the Q node Qnode. Also, the 4qth transistor T4*q* may be turned off in the B period B and the D period D in which a low signal is supplied to the Q node Qnode, and only the 41st transistor T41 and a fourth transistor T4 may be turned on. Therefore, the high level voltage VDD may be supplied to the QB node through the fourth transistor T4. However, the switching unit 220 may be configured in various structures in addition to a structure illustrated in FIG. 5.

For example, as illustrated in FIG. 7, the switching unit 220 may further include an induction transistor T4*a* for inducing the high level voltage VDD, supplied to the switching unit 220, to the low level node nL. In the C period C, the high level voltage VDD may be discharged to the low level node nL through the 41st transistor T41 and the induction transistor T4*a*. Therefore, in the C period C, a low signal may be supplied to the QB node QBnode. In this case, a capacitor may be provided between a gate of the fourth transistor T4 and the QB node QBnode. In the C period C, when a low signal is supplied to the QB node QBnode, the capacitor may turn off the fourth transistor T4 to allow the high level voltage VDD not to be supplied to the QB node QBnode. Also, in the B period B and the C period C, when a high signal is supplied to the QB node QBnode, the capacitor may turn on the fourth transistor T4 to allow the high level voltage VDD to be supplied to the QB node QBnode. Also, in the A period A, when a low signal is supplied to the QB node QBnode, the capacitor may turn off the fourth transistor T4 to allow the high level voltage VDD not to be supplied to the QB node QBnode.

The induction transistor T4*a* may be turned on at the same time with the writing control transistor T5*a,* and thus, the same writing control signal may be supplied to the induction transistor T4*a* and the writing control transistor T5*a*.

To provide an additional description, the switching unit 220 including no induction transistor T4*a* may allow the high level voltage VDD not to be supplied to the QB node in the A period A, and in the other periods (i.e., the B period B, the C period C, and the D period D), the high level voltage VDD may be supplied to the QB node. In this case, in the C period C, even when the high level voltage VDD is supplied to the QB node, the high level voltage VDD may be discharged through the writing control transistor T5*a,* and thus, a low signal cannot be substantially supplied to the QB node.

If the induction transistor T4*a* is included in the switching unit 220, the high level voltage VDD may be discharged through the 41st transistor T41 and the induction transistor T4*a* in the C period C, and thus, the high level voltage VDD may not be supplied to the QB node through the fourth transistor T4. Particularly, since the fourth transistor T4 is turned off by the capacitor, the high level voltage VDD may not be supplied to the QB node through the fourth transistor T4.

To provide an additional description, if the induction transistor T4 and the capacitor are not provided, in the C period C, the high level voltage VDD may be applied to the QB node and then discharged, and thus, a low signal may be supplied to the QB node. However, if the induction transistor T4 and the capacitor are provided, in the C period C, the high level voltage VDD supplied to the QB node may be fundamentally cut off.

Particularly, in an aspect of the present disclosure, the fourth transistor T4 and the writing control transistor T5*a* may be configured to have a size as large as possible in comparison with the other transistors included in the stage as illustrated in FIG. 7.

For example, a high voltage passing through the fourth transistor T4 and a low voltage based on the writing control transistor T5*a* may be used as the emission control signal EMn+a, and thus, in order to quickly charge the emission line with a high voltage or a low voltage, a capacity of each of the fourth transistor T4 and the writing control transistor T5*a* may be large. Therefore, the fourth transistor T4 and the writing control transistor T5*a* may be configured to have a large size in comparison with the other transistors.

To provide an additional description, the fourth transistor T4 may perform a function of charging the emission line EM with a high voltage to turn on the emission transistor Tsw3, in addition to a function of charging the QB node with a high voltage. Therefore, in consideration of a load of the emission line EM, the fourth transistor T4 may be configured to have a size which is equal to or larger than that of a transistor which outputs an emission control signal having a high level in an emission driver applied to the related art.

Moreover, the writing control transistor T5*a* may perform a function of charging the emission line EM with a low voltage to turn off the emission transistor Tsw3, in addition to a function of discharging the QB node. Therefore, in consideration of a load of the emission line EM, the writing control transistor T5*a* may be configured to have a size which is equal to or larger than that of a transistor which outputs the emission control signal having a low level in the emission driver applied to the related art.

For example, in the stage illustrated in FIG. 5, the fourth transistor T4 and the writing control transistor T5*a* may be configured to have a size which is equal to or larger than that of each of a transistor supplied with a start signal VST, the 41st transistor T41, the 4qth transistor T4*q,* and a transistor supplied with a reset signal VRST.

In this case, a sixth transistor T6 through which the gate pulse is output and a seventh transistor T7 through which the gate low signal is output may be configured to have a size, and thus, the fourth transistor T4 and the writing control transistor T5*a* may be configured to have a size which is equal to or larger than that of each of the sixth transistor T6 through which the gate pulse is output and the seventh transistor T7 through which the gate low signal is output.

Sixth, the carry generator 230 may generate a writing control signal for controlling the writing control transistor T5*a* included in an n–a$^{th}$ stage.

For example, a carry signal Vinp n output from the carry generator 230 may become the writing control signal for controlling the writing control transistor T5*a* included in an n-ath stage.

The carry generator 230 may generate a carry signal referred to by Vinp (n+a) in FIG. 6. A carry signal Vinp (n+a) illustrated in FIG. 6 may be a carry signal supplied from an n+ath stage to the nth stage, and as described above, the carry signal may be used as the writing control signal.

However, the carry signal needs not have a form illustrated in FIG. 6. The carry signal may be configured to have a high value in at least the C period C.

Therefore, the carry signal may be configured to have various forms, and thus, the carry generator 230 may also be changed to various structures.

That is, the carry generator 230 may be configured as various types for generating the above-described carry signal Vinp n.

For example, as illustrated in FIG. 8, the carry generator 230 may be configured with two transistors T6*cr* and T7*cr* and one capacitor C6*cr.* In the carry generator 230 illustrated in FIG. 8, a 6crth transistor T6*cr* may be connected between a terminal to which a clock CLK1 is input and a terminal through which the carry signal Vinp n is output, and a gate of the 6cr$^{th}$ transistor T6*cr* may be connected to the Q node Qnode. A 7crth transistor T7*cr* may be connected between a terminal to which a low voltage VSSSA is input and a terminal through which the carry signal Vinp n is output, and a gate of the 7cr$^{th}$ transistor T7*cr* may be connected to the QB node QBnode. The carry generator 230 illustrated in FIG. 8 may output the carry signal having a high value in at least the C period C. The capacitor C6*cr* is connected between the Q node Qnode and the terminal through which the carry signal Vinpn is output.

In addition to the carry generator 230 illustrated in FIG. 8, various types of carry generators 230 may be applied to the present disclosure.

As described above, even without an emission driver, the emission control signal may be generated. Therefore, a circuit provided in the non-display area of the organic light emitting display panel is simplified, and thus, a width of the non-display area of the organic light emitting display panel is reduced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An organic light emitting display panel comprising:

a display area including a plurality of pixels displaying an image; and a non-display area surrounding an outer side of the display area, wherein each of the plurality of pixels comprises a switching transistor connected to a plurality of gate line and a plurality of data line, a driving transistor connected to the switching transistor and an organic light emitting diode, and an emission transistor connected to the driving transistor, a gate driver is embedded in the non-display area to supply a gate signal to the plurality of gate lines provided in the display area and includes a plurality of stages respectively connected to the plurality of gate lines, wherein an nth stage of the plurality of stages comprises, a pull-up transistor outputting a gate pulse to an $n^{th}$ gate line of the plurality of gate lines, a pull-down transistor outputting a gate low signal to the $n^{th}$ gate line, a selection signal generator connected to a gate of the pull-up transistor and a gate of the pull-down transistor, and a writing control transistor disposed between the pull-down transistor and the selection signal generator, connected between a QB node supplied with a QB node signal and a low voltage node supplied with a low level voltage, and turned on or off by a writing control signal, wherein the QB node is connected to an emission transistor included in each of pixels connected to an $n+a^{th}$ gate line, wherein "n" is a nature number, and "a" is an integer.

2. The organic light emitting display panel of claim 1, wherein the $n^{th}$ stage further comprises a switching unit connected between a Q node and a high level node supplied with a high level voltage higher than the low level voltage, wherein the switching unit is located between the selection signal generator and the pull-up transistor.

3. The organic light emitting display panel of claim 2, wherein the switching unit transfers a high signal to the QB node when a low signal is supplied to the Q node.

4. The organic light emitting display panel of claim 1, wherein the switching unit further comprises an induction transistor inducing the high level voltage to the low level node, wherein the high level voltage is supplied to the switching unit.

5. The organic light emitting display panel of claim 1, wherein the $n^{th}$ stage further comprises a carry generator connected to a writing control transistor included in an $n-a^{th}$ stage to generate the writing control signal.

6. The organic light emitting display panel of claim 1, wherein the emission transistor controls an emission timing of the organic light emitting diode.

7. The organic light emitting display panel of claim 1, wherein the gate signal comprises a gate pulse for turning on the switching transistor and a gate low signal for turning off the switching transistor.

8. The organic light emitting display panel of claim 1, wherein the gate driver generates an emission control signal to be supplied to the emission transistor included in each of the pixels connected to the $n+a^{th}$ gate line, based on a QB node signal used to generate the gate low signal supplied through the $n^{th}$ gate line.

9. An organic light emitting display device comprising:

an organic light emitting display panel including a plurality of pixels displaying an image in a display area and a non-display area surrounding an outer side of the display area, a plurality of gate lines, a plurality of data lines, a plurality of pixels, and a gate driver supplying gate signals to a plurality of switching transistors in the plurality of pixels;

a data driver supplying data voltages to the plurality of data lines; and a controller controlling the gate driver and the data driver, wherein the gate driver is embedded in the non-display area, and the gate driver generates an emission control signal to an emission transistor included in each of the plurality of pixels connected to an $n+a^{th}$ gate line, based on a QB node signal used to generate the gate low signal supplied through an $n^{th}$ gate line, wherein each of the plurality of pixels includes a switching transistor connected to the plurality of gate lines and the plurality of data lines, a driving transistor connected to the switching transistor and an organic light emitting diode, and an emission transistor controlling an emission timing of the organic light emitting diode, and the gate signal includes a gate pulse for turning on the switching transistor and a gate low signal for turning off the switching transistor, and "n" is a nature number, and "a" is an integer.

10. The organic light emitting display device of claim 9, wherein the gate driver includes a plurality of stages connected to the plurality of gate lines.

11. The organic light emitting display device of claim 9, wherein an $n^{th}$ stage of the plurality of stages comprises:

a pull-up transistor outputting a gate pulse to the $n^{th}$ gate line of the plurality of gate lines;

a pull-down transistor outputting a gate low signal to the $n^{th}$ gate line;

a selection signal generator connected to a gate of the pull-up transistor and a gate of the pull-down transistor; and a writing control transistor provided between the pull-down transistor and the selection signal generator, connected between a QB node supplied with a QB node signal and a low voltage node supplied with a low level voltage, and turned on or off by a writing control signal, wherein the QB node is connected to the emission transistor included in each of the plurality of pixels connected to the $n+a^{th}$ gate line.

12. The organic light emitting display device of claim 11, wherein the $n^{th}$ stage outputs the gate pulse to the $n^{th}$ gate line at a first timing when the switching transistor connected to the $n^{th}$ gate line is turned.

13. The organic light emitting display device of claim 12, wherein the $n^{th}$ stage supplies a high signal to the QB node to output the gate low signal to the $n^{th}$ gate line during a period other than the first timing in one frame period.

14. The organic light emitting display device of claim 13, wherein the $n^{th}$ stage turns on the writing control transistor to supply a low signal to the QB node during a writing period, in which the emission transistor included in each of the plurality of pixels connected to the $n+a^{th}$ gate line is turned off during a period in which the gate low signal is output to the $n^{th}$ gate line.

15. The organic light emitting display device of claim 11, wherein the $n^{th}$ stage further comprises a switching unit connected between a Q node and a high level node supplied with a high level voltage higher than the low level voltage, wherein the switching unit is located between the selection signal generator and the pull-up transistor.

16. The organic light emitting display device of claim 15, wherein the switching unit transfers a high signal to the QB node when a low signal is supplied to the Q node.

17. The organic light emitting display device of claim 11, wherein the switching unit further comprises an induction transistor inducing the high level voltage to the low level node, wherein the high level voltage is supplied to the switching unit.

18. The organic light emitting display device of claim 11, wherein the $n^{th}$ stage further comprises a carry generator generating a writing control signal for controlling a writing control transistor included in an $n-a^{th}$ stage.

19. An organic light emitting display panel including a plurality of pixels displaying an image in a display area and a non-display area surrounding an outer side of the display area, comprising:

a switching transistor in the plurality of pixels and connected to a plurality of gate line and a plurality of data line;

a driving transistor in the plurality of pixels and connected to the switching transistor and an organic light emitting diode;

an emission transistor connected to the driving transistor;

a gate driver embedded in the non-display area to supply a gate signal to the plurality of gate lines provided in the display area and including a plurality of stages connected to the plurality of gate lines; and a controller controlling the gate driver embedded in the non-display area, wherein the gate driver generates an emission control signal to the emission transistor included in each of the plurality of pixels connected to an $n+a^{th}$ gate line, based on a QB node signal used to generate a gate low signal supplied through an $n^{th}$ gate line, and "n" is a nature number, and "a" is an integer.

20. The organic light emitting display panel of claim 19, wherein an $n^{th}$ stage of the plurality of stages comprises, a pull-up transistor outputting a gate pulse to an $n^{th}$ gate line of the plurality of gate lines, a pull-down transistor outputting a gate low signal to the $n^{th}$ gate line, a selection signal generator connected to a gate of the pull-up transistor and a gate of the pull-down transistor, and a writing control transistor disposed between the pull-down transistor and the selection signal generator, connected between the QB node supplied with a QB node signal and a low voltage node supplied with a low level voltage, and turned on or off by a writing control signal, wherein the QB node is connected to an emission transistor included in each of pixels connected to an $n+a^{th}$ gate line.

* * * * *